Inventor
COLIN J. SANDWITH

United States Patent Office 3,435,668
Patented Apr. 1, 1969

3,435,668
METHOD OF DETERMINING PREFERRED ORIENTATION IN METALS
Colin J. Sandwith, Corvallis, Oreg., assignor to the United States of America as represented by the Secretary of the Interior
Filed Aug. 26, 1966, Ser. No. 576,180
Int. Cl. G01n 3/48, 21/60
U.S. Cl. 73—88                                10 Claims

ABSTRACT OF THE DISCLOSURE

A greatly simplified method for determining preferred orientation in single crystal and polycrystalline metals is presented. The method involves forming an indentation with a symmetrical indentor in the surface of a first specimen having an unknown preferred orientation but known crystal structure to obtain an indentation response. Then comparing that response to the responses obtained by indenting a plurality of specimens each having the same crystal structure as said first specimen and each having a different preferred orientation. By comparing these responses, the match will be readily apparent and the preferred orientation of the first specimen will be obtained.

---

This invention relates to a method of determining crystal orientation in metals. More specifically, the present invention relates to a method of determining preferred orientation in crystalline metals.

Single crystals of metals consist of a three-dimensional lattice array of atoms which gives rise to a marked directionality in physical and mechanical properties. The single crystal axes, which are defined by the three-dimensional lattice array of atoms, are related to the directionality in physical and mechanical properties. Crystals exhibiting a directionality in a property are termed anisotropic with respect to that property. Directionality of a property is termed anisotropy. In contrast to anisotropic single crystals, a few polycrystalline metal aggregates containing a large number of single crystals do not exhibit directionality in mechanical or physical properties. The explanation commonly given to account for the isotropic nature of these polycrystalline metals is that the single crystal axes are randomly oriented within the aggregate structure, thereby averaging or cancelling out the directionalities of the individual crystals.

The orientation distribution of the single crystal axes becomes nonrandom when any metal is plasticly deformed such as by commercial forging and rolling processes. The axes of individual crystals are altered toward a preferred orientation. In general, slip may be expected to occur on the equivalent slip system or systems in every crystal present.

Independent of their initial orientation, the axes of every crystal being extended in a specific direction should rotate to a stable orientation with respect to that direction. In consequence, the worked metal simulates to some extent the directional properties of a single crystal and is said to possess a preferred orientation or texture.

If a polycrystalline material has a preferred orientation or texture, it is anisotropic in nature and exhibits a directionality in its physical and mechanical properties. The practical importance of preferred orientation lies in the variations in mechanical and physical properties with direction. Plasticity, ductility, ultimate tensile strength, magnetic permeability, hysteresis, and flux are among the properties which show directionality. Directionality in these properties may be beneficial or detrimental depending upon the use of the metal. For example, if the metal is to be further worked it may show earing, thinning, puckering or splitting because of a preferred orientation. Consequently, it is important to have available in the laboratory and on the production line a quick, simple and economical test for determining the texture of metal work pieces.

Furthermore, it is also important to have readily available a simple test which may be used to determine the directionality of single crystals. Such a test would be useful to orient single crystals, identify specimens, identify deformation textures, predict hardness anisotropy and ductility anisotropy. Various methods have been developed to detect anisotropy and/or determine texture. There are a large number of relatively tedious methods available for determining the presence of anisotropy. There are tests based on yield strength, tensile strength, elongation, reduction in area, elastic moduli, bend and notch bend tests, tests based on the formation of ears on drawn cups, the direction of tears, the arrangement of scattered sand on vibrated plates, and on magnetic-torque measurements.

The disadvantages with all of these tests are that they:

(1) reveal only the presence of anisotropy and cannot be used to determine the preferred orientation or texture, which gives rise to anisotropy,
(2) are very time consuming,
(3) are expensive, and
(4) with the exception of elastic moduli, vibrated plates and magnetic-torque measurements, they are destructive tests.

Methods which determine preferred orientation have either been based on X-ray diffraction studies or etch pitting. These methods also have their disadvantages. The various X-ray diffraction techniques, while being accurate, require the use of elaborate X-ray equipment, and are limited in their application to small specimens as the size of the specimen is limited to that which the apparatus can accommodate. Larger work pieces must be sectioned. Furthermore, X-ray diffraction techniques cannot be used to determine the variation of texture over short distances, because the X-ray beam strikes on a rather large area of the specimen. Etch pitting is also very time consuming and has limited application to metals of large grain size, which show etch pitting and have not been recrystallized or worked to a more than 40 to 50 percent reduction in height.

Accordingly, it is an object of the present invention to provide a simple and economical method for the determination of preferred orientation in metals.

Further, it is an object of this invention to provide a method of determining preferred orientations which is applicable to both single crystals and polycrystalline metals.

Still further, it is an object of this invention to provide a method of determining preferred orientations of plasticly deformed polycrystalline aggregates.

These and other objects of the invention will become apparent from the following disclosure wherein reference is made to the figures of the accompanying drawings, and wherein for the purposes of this disclosure the term "response" is defined to be the shape, form, symmetry and orientation of an indentation.

Briefly, the present invention comprises a method of determining preferred orientation in metals of known crystal structure wherein indentations are made in the surface of the metal and the responses resulting from those indentations are matched with responses resulting from indentations made in single crystals or polycrystalline metals having the same crystal structure and known preferred orientations.

The advantages of the present method are chiefly derived from the ease by which it may be performed on materials of all sizes and shapes from single crystals to large polycrystalline aggregates without the use of time consuming or expensive tests and without the necessity of sectioning.

This novel method is based upon the inventor's discovery that different specimens of metals whether single crystals or polycrystalline aggregates will respond identically to an indentor if they possess the same crystal structure and the same preferred orientation. For undeformed single crystals, the parameters affecting the response to an indentor are (1) space-lattice type (body centered cubic, face centered cubic, hexagonal, etc.), and (2) crystal orientation. For polycrystalline materials the parameters affecting the response to an indentor are: (1) space-lattice type; (2) preferred orientation. (3) size and shape of crystallites and (4) defects such as voids, grain boundaries, cracks and inclusions. The last two parameters may be easily controlled so that for both single crystals and for polycrystalline materials the important parameters determining the response to an indentor are space-lattice type and preferred orientation.

Figure 1:
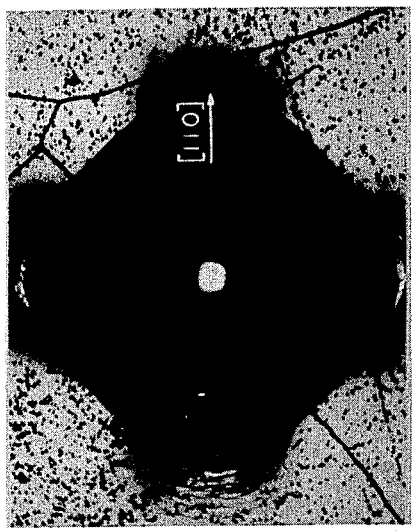
FIG. 1 represents a 150× photomicrograph of a typical response of an indentation in the (100) of a tungsten single crystal.
Figure 5:
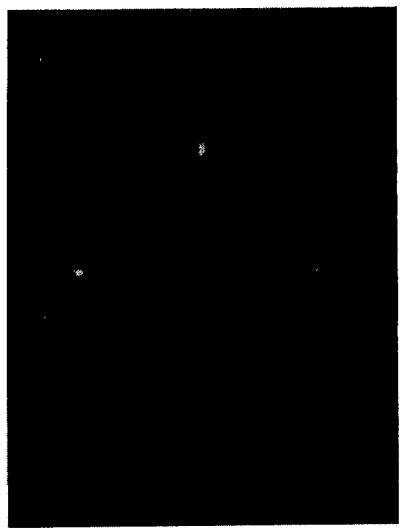
FIG. 5 represents a 100× photomicrograph of the halo pattern of an indentation in the (100) of a tungsten single crystal.
Figure 2:
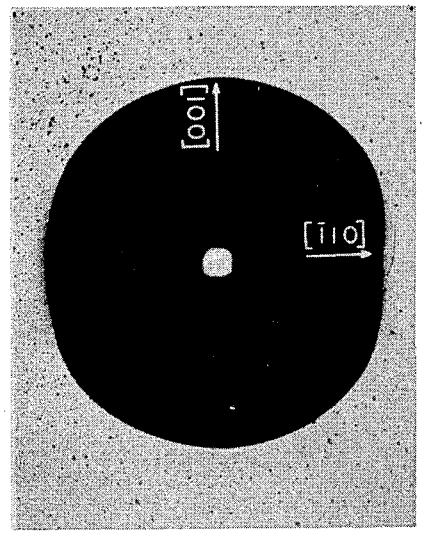
FIG. 2 represents a 150× photomicrograph of a typical response of an indentation in the (100) of a tungsten single crystal.
Figure 6:
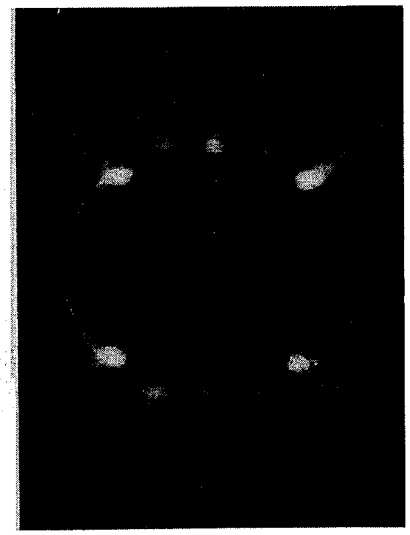
FIG. 6 represents a 100× photomicrograph of the halo pattern of an indentation in the (110) of a tungsten single crystal.
Figure 3:
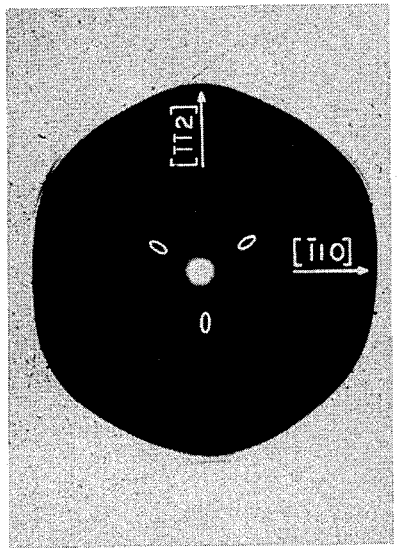
FIG. 3 represents a 150× photomicrograph of a typical response of an indentation in the (111) of a tungsten single crystal.
Figure 7:
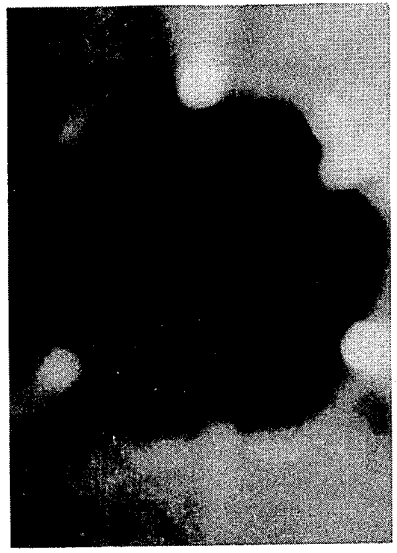
FIG. 7 represents a 150× photomicrograph of the halo pattern of an indentation in the (111) of a tungsten single crystal.
Figure 4:
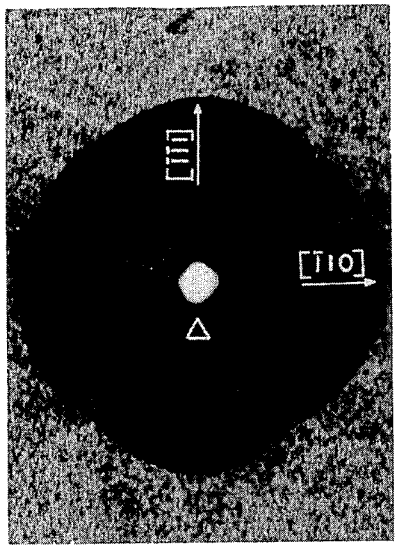
FIG. 4 represents a 150× photomicrograph of a typical response of an indentation in the (112) of a tungsten single crystal.
Figure 8:
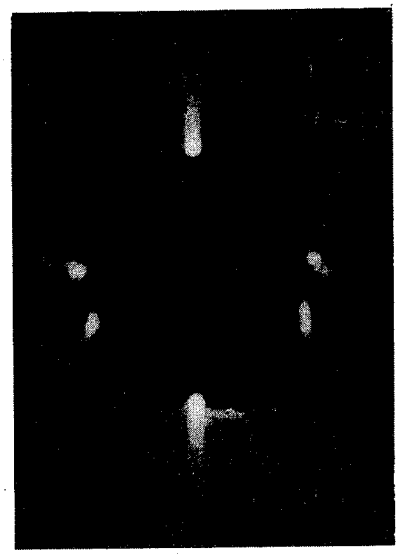
FIG. 8 represents a 100× photomicrograph of the halo pattern of an indentation in the (112) of a tungsten single crystal.

The method of the present invention makes use of these parameters in the following manner. Single crystals or aggregates of a metal having a certain known space-lattice type such as, for example, body centered cubic, are tested by conventional means to determine their preferred orientation. The conventional methods used include X-ray diffraction and etch pitting. Specimens are obtained whose preferred orientations are those will low Miller indices. For most crystal structures only three or four low indices planes need be considered as it is rare that any metal having that crystal structure will exhibit a preferred orientation which is not one having a low Miller indices. The specimens which are identified by conventional means as having orientations as described above are then indented. The indenter used should be harder than the specimen, have a symmetrical cross-section, preferably circular, and have the ability to retain its shape during indentations. The size of the indenter is not critical. Many commercial hardness testers are suitable as indenters. Preferably, the indenter is one having a circular cross-section, such as a Brale 120° spheroconical diamond indenter. The microphotographs of these indentations comprise the responses. A reference direction may be assigned to these photographs to orient them relative to a pole figure and/or to a later specimen response. A pole figure may be made of the known specimen of the time its preferred orientation is determined. The assumed reference direction on the specimen is drafted on the pole figure by knowing the position of the specimen during pole figure analysis. When a photomicrograph of an indentation is made, the assumed reference direction on the specimen is drafted on the photomicrograph by knowing the position of the specimen during the exposure. For example, in FIG. 1, the [110] direction is parallel to the [110] of the specimen in the plane in which the photograph was taken, i.e., the one in which the indentation was made. The same is true of the [100] and [110] directions shown in FIG. 2, the [1̄1̄2] and [1̄10] directions in FIG. 3, and the [1̄1̄1] and [1̄10] directions shown in FIG. 4. The pole figure and the response are then related by the reference direction which appears on both pieces of data.

FIGS. 1–4 represent photomicrographs of the responses exhibited in the (100), (110), (111) and (112) of tungsten single crystals. The crystals are of the body centered cubic type and the preferred orientation represented are the ones which most commonly occur as the preferred orientations in worked and recrystallized materials. The indenter used to prepare these responses was a Brale 120° spheroconical diamond indenter. A 60 kg. load was applied to the indenter. To produce high quality responses as shown in the figures, it is desirable to polish the surface of the specimen. This may be done mechanically or by etching, but etching should not be used if it decreases the brightness or flatness of the specimen. All of the specimens used in FIGS. 1–4 were electrolytically polished and etched with 2 percent NaOH solution. After photomicrographs of knowns such as those shown in FIGS. 1–4 have been prepared, the preferred orientation of the unknown may be determined by photographing its response to an identical indenter and comparing that response to the responses obtained from the knowns. When the match is made, the preferred orientation of the unknown has been identified as the preferred orientation of the known having the same response. To match the unknown with the knowns, the shape, form, symmetry and orientation of unkown response is compared with the responses to the identical indenter of the specimens having known orientations. The match will be obvious.

Many of the materials being tested for preferred orientation are deformed materials. With these specimens, an arbitrary reference direction is chosen with respect to some characteristic of the deformed specimen. This reference direction is used as a datum or reference in illustrating, analyzing, describing, or discussing any directional property of the specimen. Generally the assumed reference direction is taken as the rolling direction during deformation.

Since the type of metal is not a dominant parameter affecting the response, it is not necessary that a set of known responses be established for each metal, rather, it is necessary only that there be a set for each space lattice type. Therefore, a set of responses such as shown in FIGS. 1–4 illustrating the responses of a tungsten single crystals having preferred orientations of (100), (110), (111) and (112), respectively, may function as the set of knowns for any of the body centered cubic metals such as tungsten, molybdenum, iron, niobium, tantalum, vanadium, chromium, lithium, sodium and potassium. Likewise only one set of knowns need be prepared for all face centered cubic determinations and all hexagonal studies, etc.

The set of known responses represented by FIGS. 1–4 were obtained by focusing a microscope at from 100×–150× on the indentation. It has been found that magnifications in the range of 25×–500× may be used. An alternative method of obtaining known responses comprises focusing the microscope just below the specimen surface with the light source stopped down from 60–95 percent until a light halo of from 1/32–1/4 inch in width is produced around the black indentation. These halo responses may be used in the same manner that the regularly focused responses were used. A set of halo responses obtained by focusing the microscope just below the specimen surface for tungsten single crystals is shown in FIGS. 5-8. The set includes responses of (100), (110), (111) and (112) orientations. The halo responses may be used as an alternative to the regular responses or they may be used as an additional set of knowns to act as a check to the original determination of orientation. The halo responses do not require a different type of indentation. In the figures, halo responses 5, 6, 7 and 8 are related to responses 1, 2, 3 and 4, respectively, since the halo responses represent photomicrographs of the same indentation surface and are identically oriented.

It can be seen that the above-described methods enable a quick and simple determination of preferred orientation in single crystals or in polycrystalline materials. Various modifications and adaptations of the instant method are possible without varying from the scope of the invention. For example, the present method may be used to determine the texture of an alloy if that alloy has a uniform known crystal structure. If the alloy has a known crystal structure, indentations are made in the alloy and the responses are matched with a set of known responses of specimens having the same crystal structure and known orientations. The present method may also be used alone or in conjunction with other known texture determining methods to construct a stereogram of the ideal orientation of a specimen. Still other modifications and adaptations within the scope of the present invention will become apparent to the person of ordinary skill in the art.

What is claimed is:

1. A method of determining preferred orientation in metals comprising, forming an indentation with a symmetrical indentor in the surface of a first metal specimen having a known crystal structure and unknown preferred orientation to obtain an indentation response, comparing the shape, form and symmetry of said indentation response to the shape form and symmetry of indentation responses obtained by indenting, with the same indentor, a plurality of metal specimen each having the same crystal structure as said first metal specimen and each having a different but known preferred orientation.

2. The method of claim 1 wherein said first metal specimen is a single crystal.

3. The method of claim 1 wherein said first metal specimen is a polycrystalline aggregate.

4. The method of claim 1 wherein said first metal specimen is an alloy exhibiting a uniform crystal structure.

5. The method of claim 1 wherein the indentation responses comprise photographs of said indentations.

6. The method of claim 5 wherein the photograph is a photomicrograph obtained by focusing a microscope below the surface of the indentation.

7. The method of claim 5 wherein the photograph is a photomicrograph obtained by focusing a microscope above the surface of the indentation.

8. The method of claim 1 wherein said indentor is a diamond spheroconical indentor.

9. The method of claim 1 wherein said specimen of known orientation are single crystals of the same type of metal as said first metal specimen.

10. The method of claim 1 wherein said specimen of known orientation are polycrystalline aggregates of the same type of metal as said first metal specimen.

References Cited

UNITED STATES PATENTS 2,182,235   12/1939   Polushkin _____ 73—78

FOREIGN PATENTS 167,343   6/1965   U.S.S.R.

RICHARD C. QUEISSER, *Primary Examiner.*

C. I. McCLELLAND, *Assistant Examiner.*

U.S. Cl. X.R.

73—81